US012720196B2

(12) United States Patent
Sumida

(10) Patent No.: US 12,720,196 B2
(45) Date of Patent: Aug. 25, 2026

(54) IMAGE CAPTURING APPARATUS, METHOD OF CONTROLLING THE SAME, AND STORAGE MEDIUM

(71) Applicant: CANON KABUSHIKI KAISHA, Tokyo (JP)

(72) Inventor: Noa Sumida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 18/943,121

(22) Filed: Nov. 11, 2024

(65) Prior Publication Data

US 2025/0184604 A1 Jun. 5, 2025

(30) Foreign Application Priority Data

Dec. 4, 2023 (JP) ................................ 2023-204911

(51) Int. Cl.
*H04N 23/67* (2023.01)
*H04N 25/704* (2023.01)

(52) U.S. Cl.
CPC ......... *H04N 23/672* (2023.01); *H04N 25/704* (2023.01)

(58) Field of Classification Search
CPC .. H04N 23/672; H04N 25/704; H04N 13/239; H04N 13/246; H04N 13/296;
(Continued)

(56) References Cited

U.S. PATENT DOCUMENTS

2011/0025904 A1* 2/2011 Onuki .................. H04N 25/704 348/E5.022
2013/0113987 A1* 5/2013 Fukuda .................... G02B 7/28 348/349
(Continued)

FOREIGN PATENT DOCUMENTS

JP 2005107252 A 4/2005
JP 2006243350 A 9/2006
(Continued)

OTHER PUBLICATIONS

The above foreign patent documents were cited in the Jun. 27, 2025 Japanese Office Action, which is enclosed without an English Translation, that issued in Japanese Patent Application No. 2023-204911.

*Primary Examiner* — Abdelaaziz Tissire
(74) *Attorney, Agent, or Firm* — Cowan, Liebowitz & Latman, P.C.

(57) ABSTRACT

An image capturing apparatus includes a phase difference detection unit configured to detect a phase differences in a first direction and in a second direction, a focus detection unit configured to detect a focusing state based on the phase differences in the first direction and in the second direction and acquire reliability of the focusing state, an adjustment unit configured to perform focus adjustment based on the focusing state, and a control unit configured to control not to perform the focus adjustment based on the second direction until the reliability of the focusing state in the second direction becomes higher than a predetermined value in a case of transitioning from a first state using the phase difference in the first direction to a second state using the phase difference in the second direction.

14 Claims, 10 Drawing Sheets

(58) Field of Classification Search
CPC ...... H04N 23/611; H04N 23/67; H04N 23/73; H04N 23/88; H04N 23/957
See application file for complete search history.

(56) References Cited

U.S. PATENT DOCUMENTS

| | | | | |
|---|---|---|---|---|
| 2020/0267307 | A1* | 8/2020 | Nishio | H04N 23/687 |
| 2020/0412966 | A1* | 12/2020 | Kikuchi | G02B 7/34 |

FOREIGN PATENT DOCUMENTS

| | | | |
|---|---|---|---|
| JP | 2016130793 | A | 7/2016 |
| JP | 2017187589 | A | 10/2017 |
| JP | 2020012982 | A | 1/2020 |
| JP | 2020141122 | A | 9/2020 |
| JP | 2023121622 | A | 8/2023 |

* cited by examiner

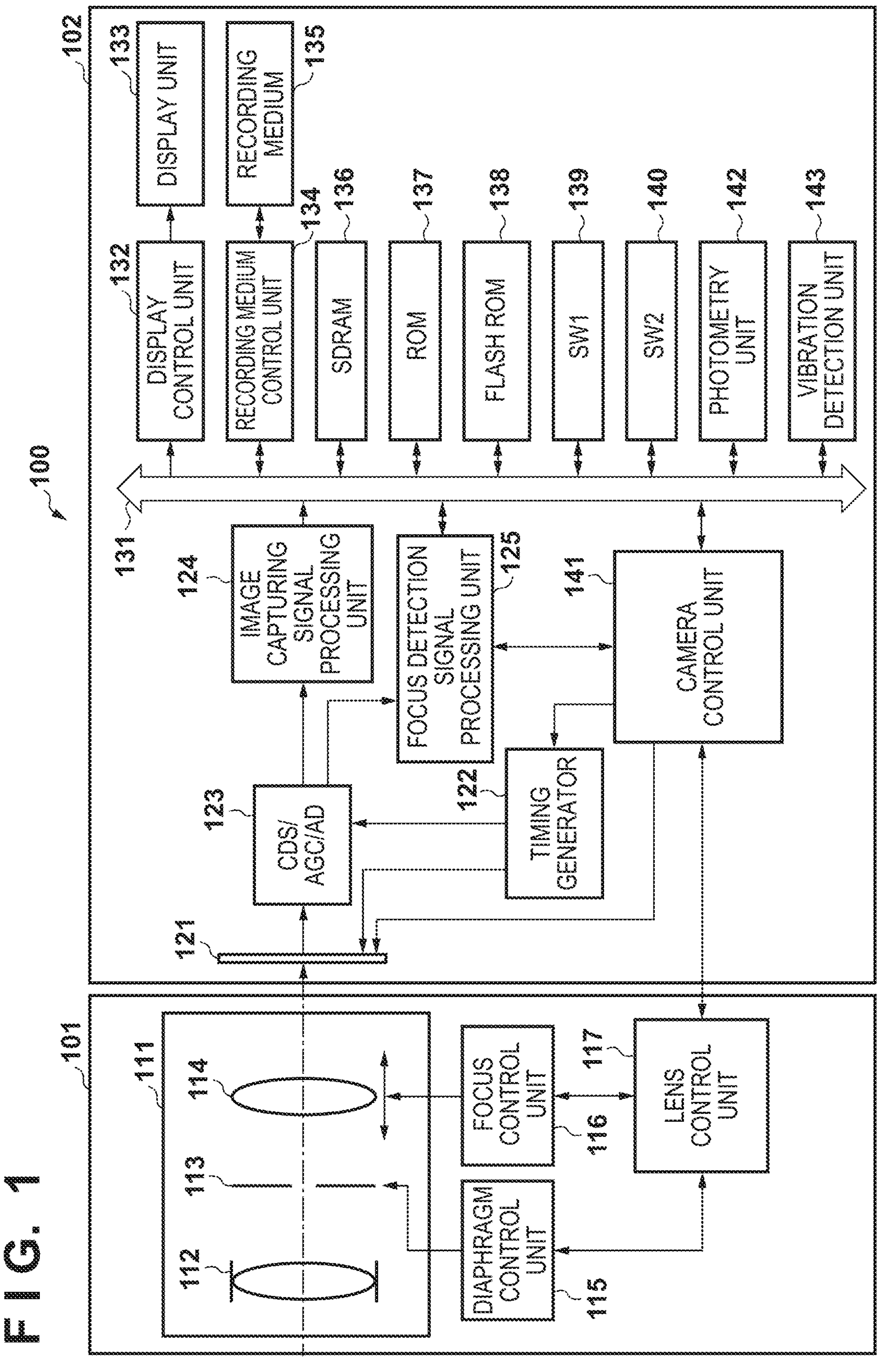
F I G. 1
100
101
102
111
112
113
114
FOCUS CONTROL UNIT
116
DIAPHRAGM CONTROL UNIT
115
LENS CONTROL UNIT
117
121
CDS/ AGC/AD
123
TIMING GENERATOR
122
IMAGE CAPTURING SIGNAL PROCESSING UNIT
124
FOCUS DETECTION SIGNAL PROCESSING UNIT
125
CAMERA CONTROL UNIT
141
131
DISPLAY CONTROL UNIT
132
DISPLAY UNIT
133
RECORDING MEDIUM CONTROL UNIT
134
RECORDING MEDIUM
135
SDRAM
136
ROM
137
FLASH ROM
138
SW1
139
SW2
140
PHOTOMETRY UNIT
142
VIBRATION DETECTION UNIT
143

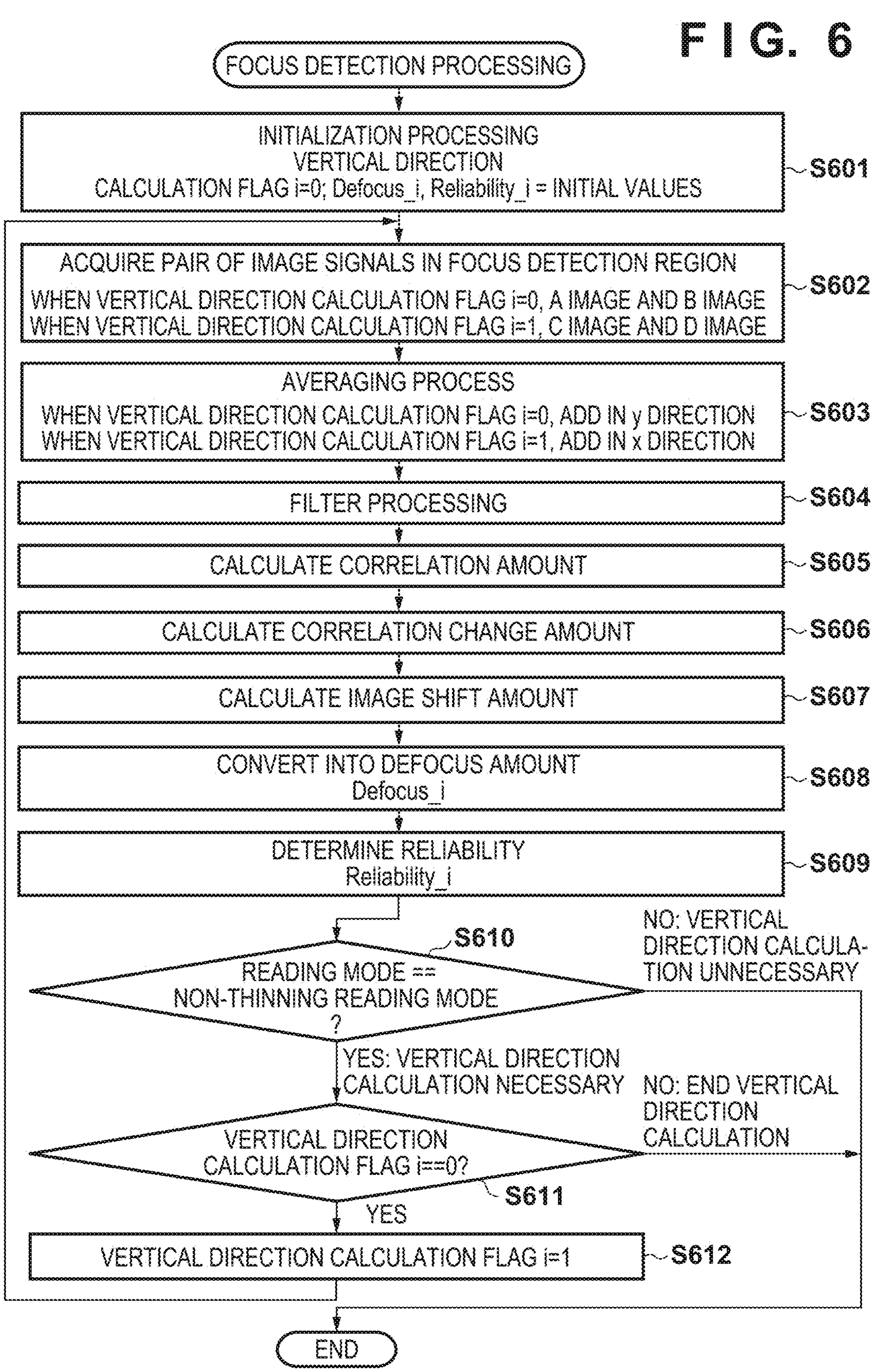
FIG. 6
FOCUS DETECTION PROCESSING
INITIALIZATION PROCESSING
VERTICAL DIRECTION
CALCULATION FLAG i=0; Defocus_i, Reliability_i = INITIAL VALUES
S601
ACQUIRE PAIR OF IMAGE SIGNALS IN FOCUS DETECTION REGION
WHEN VERTICAL DIRECTION CALCULATION FLAG i=0, A IMAGE AND B IMAGE
WHEN VERTICAL DIRECTION CALCULATION FLAG i=1, C IMAGE AND D IMAGE
S602
AVERAGING PROCESS
WHEN VERTICAL DIRECTION CALCULATION FLAG i=0, ADD IN y DIRECTION
WHEN VERTICAL DIRECTION CALCULATION FLAG i=1, ADD IN x DIRECTION
S603
FILTER PROCESSING
S604
CALCULATE CORRELATION AMOUNT
S605
CALCULATE CORRELATION CHANGE AMOUNT
S606
CALCULATE IMAGE SHIFT AMOUNT
S607
CONVERT INTO DEFOCUS AMOUNT
Defocus_i
S608
DETERMINE RELIABILITY
Reliability_i
S609
S610
READING MODE ==
NON-THINNING READING MODE
?
NO: VERTICAL DIRECTION CALCULATION UNNECESSARY
YES: VERTICAL DIRECTION CALCULATION NECESSARY
VERTICAL DIRECTION
CALCULATION FLAG i==0?
NO: END VERTICAL DIRECTION CALCULATION
S611
YES
VERTICAL DIRECTION CALCULATION FLAG i=1
S612
END

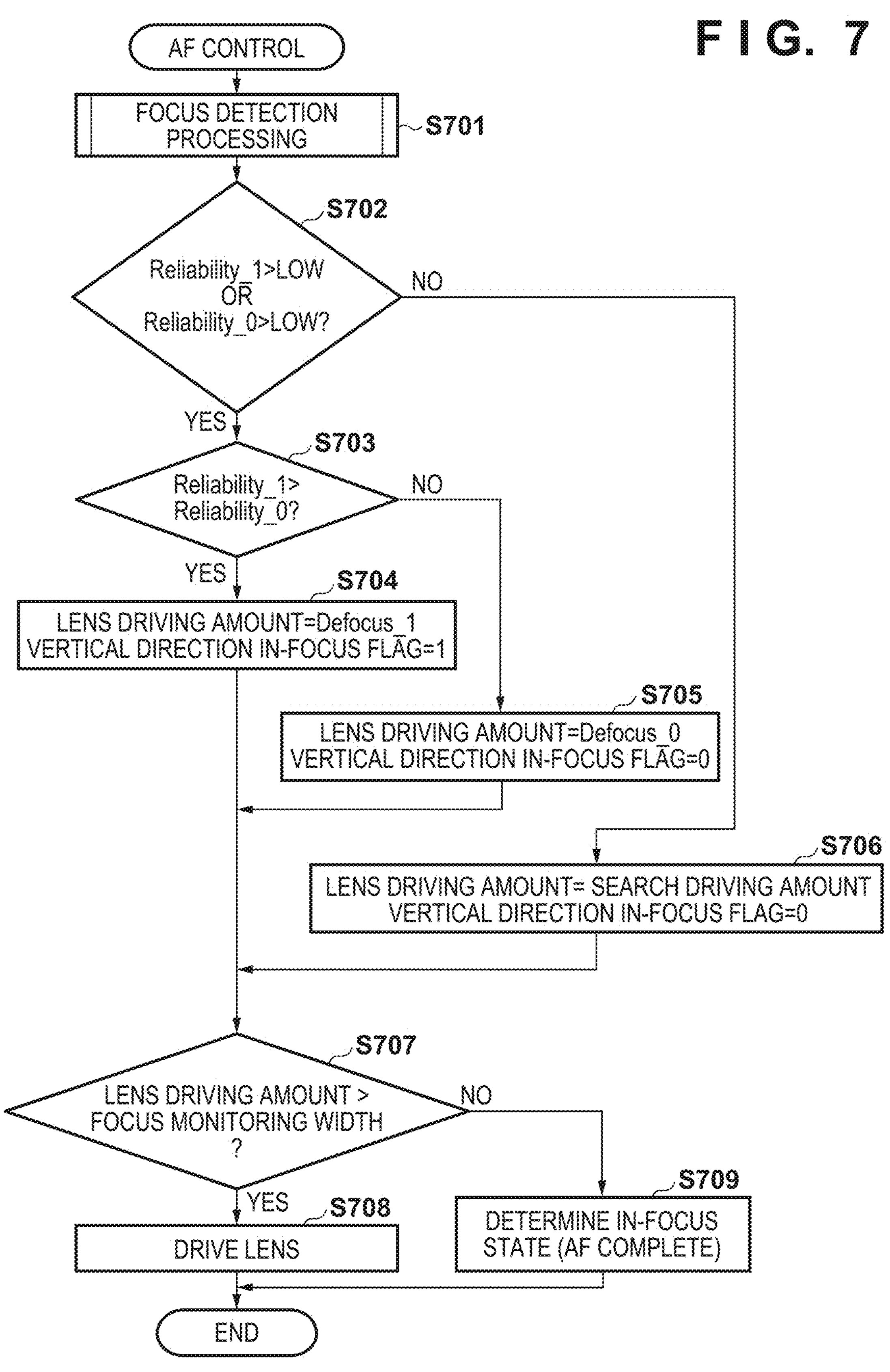
F I G. 7
AF CONTROL
FOCUS DETECTION PROCESSING
S701
S702
Reliability_1>LOW OR Reliability_0>LOW?
NO
YES
S703
Reliability_1> Reliability_0?
NO
YES
S704
LENS DRIVING AMOUNT=Defocus_1
VERTICAL DIRECTION IN-FOCUS FLAG=1
S705
LENS DRIVING AMOUNT=Defocus_0
VERTICAL DIRECTION IN-FOCUS FLAG=0
S706
LENS DRIVING AMOUNT= SEARCH DRIVING AMOUNT
VERTICAL DIRECTION IN-FOCUS FLAG=0
S707
LENS DRIVING AMOUNT > FOCUS MONITORING WIDTH ?
NO
YES
S708
DRIVE LENS
S709
DETERMINE IN-FOCUS STATE (AF COMPLETE)
END

FIG. 9

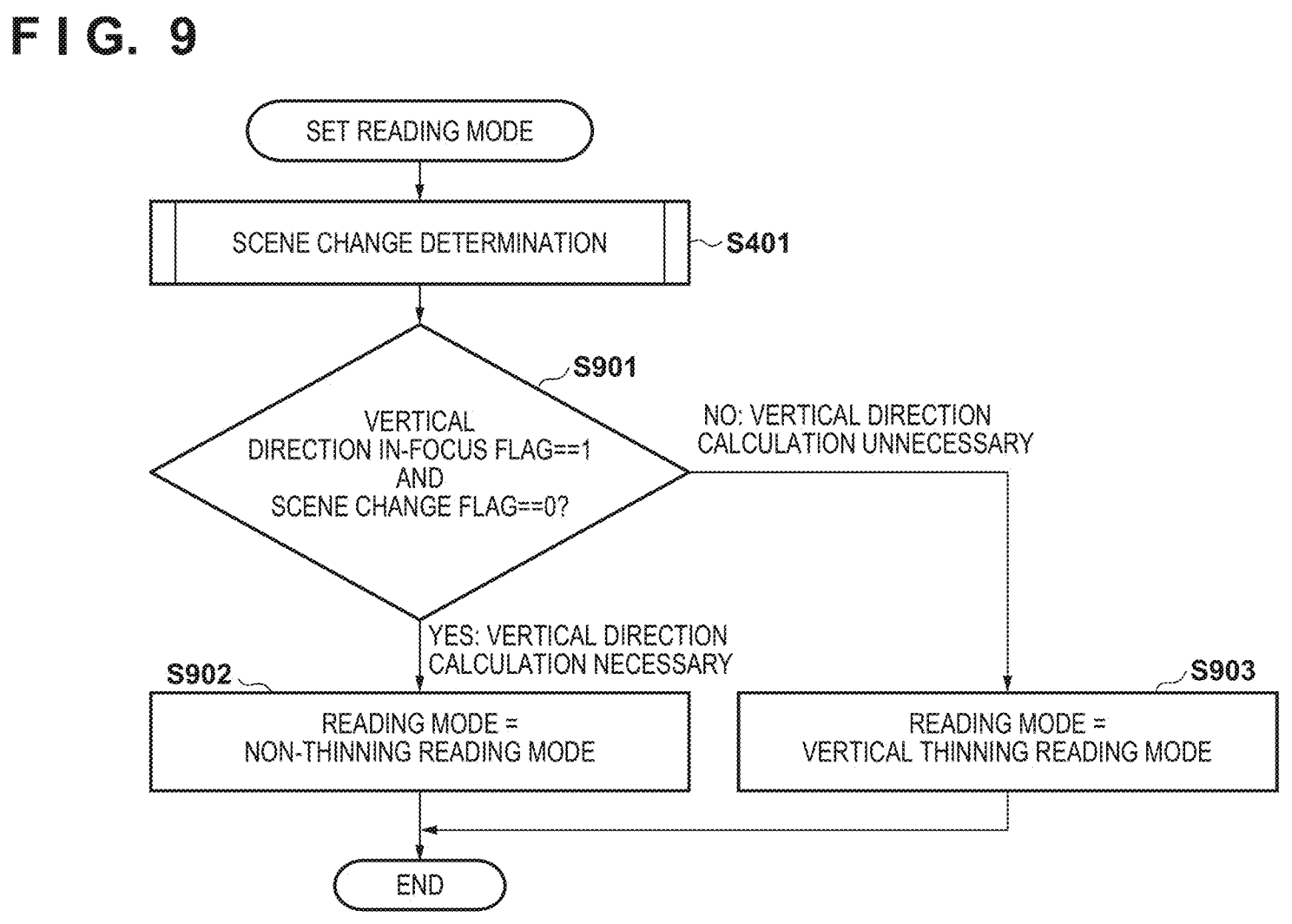

SET READING MODE

SCENE CHANGE DETERMINATION

S401

S901

VERTICAL DIRECTION IN-FOCUS FLAG==1 AND SCENE CHANGE FLAG==0?

NO: VERTICAL DIRECTION CALCULATION UNNECESSARY

YES: VERTICAL DIRECTION CALCULATION NECESSARY

S902

READING MODE = NON-THINNING READING MODE

S903

READING MODE = VERTICAL THINNING READING MODE

END

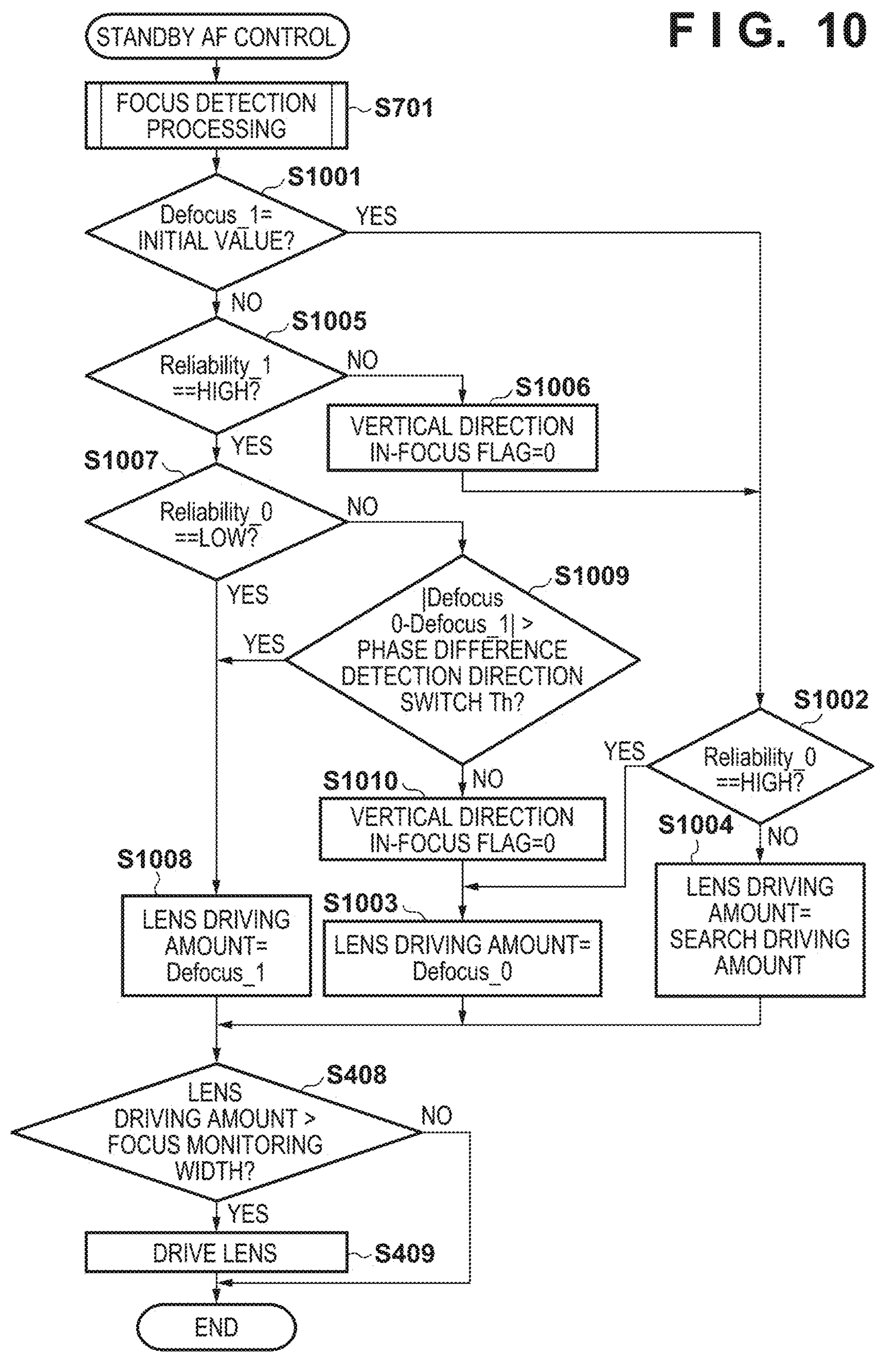

FIG. 10
STANDBY AF CONTROL
FOCUS DETECTION PROCESSING
S701
S1001
Defocus_1= INITIAL VALUE?
YES
NO
S1005
Reliability_1 ==HIGH?
NO
S1006
VERTICAL DIRECTION IN-FOCUS FLAG=0
YES
S1007
Reliability_0 ==LOW?
NO
YES
S1009
|Defocus 0-Defocus_1| > PHASE DIFFERENCE DETECTION DIRECTION SWITCH Th?
YES
S1002
Reliability_0 ==HIGH?
YES
NO
S1010
VERTICAL DIRECTION IN-FOCUS FLAG=0
S1004
LENS DRIVING AMOUNT= SEARCH DRIVING AMOUNT
S1008
LENS DRIVING AMOUNT= Defocus_1
S1003
LENS DRIVING AMOUNT= Defocus_0
S408
LENS DRIVING AMOUNT > FOCUS MONITORING WIDTH?
NO
YES
DRIVE LENS
S409
END

IMAGE CAPTURING APPARATUS, METHOD OF CONTROLLING THE SAME, AND STORAGE MEDIUM

BACKGROUND OF THE INVENTION

Field of the Invention

The present invention relates to an image capturing apparatus and a method of controlling the same.

Description of the Related Art

In recent years, image capturing apparatuses such as digital cameras are required to have high definition, and an increase in pixels has been advanced. Along with this, processing time and power consumption at the time of reading an image signal from an image capturing element increase, and such an increase is suppressed by thinning out pixels or performing averaging and reading.

An imaging plane phase difference detection method is known as a focus detection method in a general image capturing apparatus. The imaging plane phase difference detection method is a method in which pupil division is performed by one microlens and a pair of photoelectric conversion sections that are provided for each pixel of an image capturing element, and a focusing state (defocus amount) is obtained from a phase difference between a pair of image signals obtained from the pair of photoelectric conversion sections.

In Japanese Patent Laid-Open No. 2005-107252, a reading mode is changed in response to a photographing control state. Specifically, a mode of reading out all pixels (reading out without thinning) is set at the time of photographing a still image, and a mode of reading out pixels by thinning (thinning reading out) is set at the time of photographing a moving image or other times (during autofocus (AF) control or standby state). This achieves both obtaining a high-definition still image and shortening the processing time in moving image photographing or the like. In particular, during AF control immediately before photographing a still image, high-accuracy autofocus is achieved by not thinning pixels in a pupil division direction.

Along with high definition, focus detection with higher accuracy is required. In a case where pupil division is performed only in one direction by the above-described focus detection method, there is a case where focus detection cannot be performed. For example, in a case where the subject has an edge only in the same direction as the pupil division direction, the phase difference cannot be detected, and the defocus amount cannot be calculated (focus detection).

Japanese Patent Laid-Open No. 2020-141122 discloses an image capturing apparatus as follows. Pupil division in the horizontal direction is performed in a pixel in which a pair of photoelectric conversion sections are arranged in the horizontal direction, and pupil division in the vertical direction is performed in a pixel in which a pair of photoelectric conversion sections are arranged in the vertical direction. This obtains the defocus amounts in both the horizontal direction and the vertical direction. In this case, since both the horizontal direction and the vertical direction are the pupil division direction, it is necessary to read out all pixels without thinning out pixels in both the horizontal direction and the vertical direction in order to achieve highly accurate autofocus. That is, it is necessary to set a non-thinning reading mode also during AF control before photographing a still image.

On the other hand, during the standby state, it is necessary to set the thinning reading mode to suppress processing time and power consumption. In a case of executing autofocus (standby AF control) also during the standby state, it is necessary to limit the pupil division direction to one direction and to thin out pixels. For example, in a case where the pupil division direction is the horizontal direction, a mode (vertical thinning reading mode) in which pixels are thinned out and read in the vertical direction is set. In this case, the phase difference detection direction is different between the AF control before photographing the still image and the standby AF control. Therefore, when the AF control in photographing a still image is switched to the standby AF control, a problem such as being suddenly out of focus even though the subject is not changed.

Specifically, in AF control before photographing a still image, focus detection in all directions is possible by using both focus detection results with image signals in which pupil division is performed in the horizontal direction and the vertical direction. On the other hand, in the standby AF control, since the pupil division direction is only the horizontal direction, focus detection of a subject (e.g., subject with horizontal stripes) having an edge only in the same direction as the pupil division direction is impossible as described above. Therefore, when the AF control is switched to the standby AF control, there is a case of being suddenly out of focus.

In Japanese Patent Laid-Open No. 2017-187589 discloses a countermeasure against a change in a calculation result when a phase difference detection direction is switched due to movement of a subject in a case where regions where phase difference detection is performed in a horizontal direction and a vertical direction are mixed in one image region.

However, Japanese Patent Laid-Open No. 2017-187589 assumes a case where the phase difference detection can be performed in both the horizontal direction and the vertical direction, and does not assume a subject in which focus detection can be performed only in either direction. Therefore, in a case of a subject with horizontal stripes or vertical stripes, when the phase difference detection direction is switched, there is a possibility of being suddenly out of focus.

SUMMARY OF THE INVENTION

The present invention has been made in view of the above-described problems, and provides an image capturing apparatus that can perform a stable focus adjustment operation also when the detection direction of a phase difference is switched.

According to a first aspect of the present invention, there is provided an image capturing apparatus, comprising: at least one processor or circuit configured to function as: a phase difference detection unit configured to detect a phase difference in a first direction of an optical image by light having passed through different pupil regions of an optical system and a phase difference in a second direction different from the first direction; a focus detection unit configured to detect a focusing state based on at least one of the phase difference in the first direction and the phase difference in the second direction and acquire reliability of the focusing state; an adjustment unit configured to perform focus adjustment by driving the optical system based on the focusing state detected by the focus detection unit; and a control unit configured to control the adjustment unit not to perform the focus adjustment based on the phase difference in the second direction until the reliability of the focusing state detected based on the phase difference in the second direction becomes higher than a predetermined value in a case of transitioning from a first state in which focus adjustment is performed based on the phase difference in the first direction to a second state in which focus adjustment is performed based on the phase difference in the second direction.

According to a second aspect of the present invention, there is provided a method of controlling an image capturing apparatus, comprising: executing phase difference detection of detecting a phase difference in a first direction of an optical image by light having passed through different pupil regions of an optical system and a phase difference in a second direction different from the first direction; executing focus detection of detecting a focusing state based on at least one of the phase difference in the first direction and the phase difference in the second direction and acquiring reliability of the focusing state; performing focus adjustment by driving the optical system based on the focusing state detected by the focus detection; and controlling the focus adjustment not to perform the focus adjustment based on the phase difference in the second direction until the reliability of the focusing state detected based on the phase difference in the second direction becomes higher than a predetermined value in a case of transitioning from a first state in which focus adjustment is performed based on the phase difference in the first direction to a second state in which focus adjustment is performed based on the phase difference in the second direction.

Further features of the present invention will become apparent from the following description of exemplary embodiments with reference to the attached drawings.

BRIEF DESCRIPTION OF THE DRAWINGS

FIG. 1 is a block diagram illustrating a configuration of an image capturing apparatus according to a first embodiment of the present invention.

FIG. 6 is a flowchart showing focus detection processing in the first and second embodiments.

FIG. 7 is a flowchart showing AF control processing in the first and second embodiments.

FIG. 9 is a flowchart showing reading mode setting processing in the second embodiment.

FIG. 10 is a flowchart showing a standby AF process in the second embodiment.

DESCRIPTION OF THE EMBODIMENTS

Figure 2A:
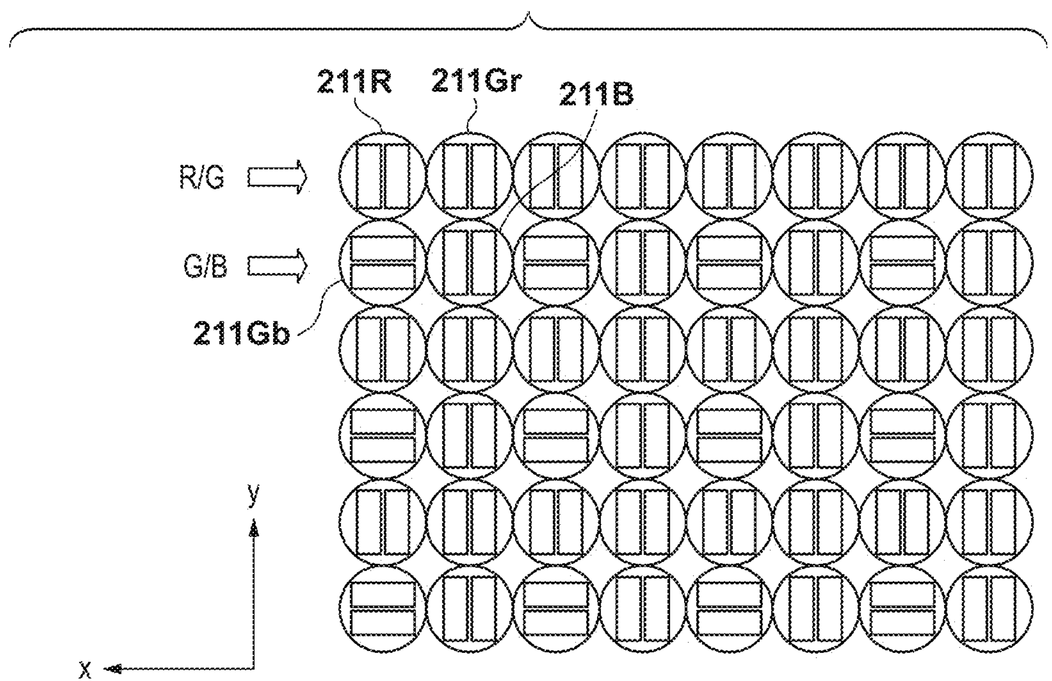
FIGS. 2A to 2C are views illustrating a configuration of a pixel array of an image capturing element.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating the configuration of an image capturing apparatus 100 according to the first embodiment of the present invention. The image capturing apparatus 100 of the present embodiment mainly includes a lens unit 101 and a camera body 102. A lens control unit 117 that integrally controls the operation of the entire lens unit 101 and a camera control unit 141 that integrally controls the operation of the entire image capturing apparatus 100 including the lens unit 101 can communicate with each other through a terminal provided on a lens mount.

First, an outline of the configuration and the operation of the lens unit 101 will be described.

The lens unit 101 is a type of interchangeable lens attachable to and detachable from the camera body 102. The lens unit 101 in FIG. 1 is a single lens, and is an example of a normal lens. A photographing lens 111 (optical system) is configured to include a fixed lens 112, a diaphragm 113, and a focus lens 114.

By driving the diaphragm 113, a diaphragm control unit 115 adjusts an aperture diameter of the diaphragm 113 and performs light amount adjustment at the time of photographing. The focus lens 114 is a focus adjustment lens and normally includes a plurality of lenses although simply illustrated by one lens in FIG. 1. As described later, a focus control unit 116 receives, via the lens control unit 117, a lens driving amount obtained by the camera control unit 141, and adjusts the focus by driving the focus lens 114. AF control is achieved by movement control of the focus lens 114 by this focus control unit 116. The diaphragm control unit 115 and the focus control unit 116 are controlled by the lens control unit 117.

Next, an outline of the configuration and the operation of the camera body 102 will be described. An image capturing element 121 includes a plurality of photoelectric conversion elements that photoelectrically converts a subject image (optical image) into charge, and includes, for example, a CCD or a CMOS sensor. The light flux incident through the photographing lens 111 of the lens unit 101 forms an image on a light receiving surface of the image capturing element 121, is converted into charge in each photoelectric conversion element in accordance with the light amount, and is accumulated. The charge accumulated in each photoelectric conversion element is sequentially read out from the image capturing element 121 as a voltage signal in accordance with the charge by a drive pulse output from a timing generator 122.

Here, the configuration of the image capturing element 121 will be described with reference to FIGS. 2A to 2C.

FIG. 2A illustrates an array of pixels 211 in a range of horizontal (x direction: horizontal direction) 8 pixel columns×vertical (y direction: vertical direction) 6 pixel rows on an imaging plane of the image capturing element 121 as viewed from the lens unit 111 side. The imaging plane is provided with a color filter in a Bayer array, color filters of red (R) and green (G) are alternately arranged in order from the left in pixels in odd-numbered rows, and color filters of green (G) and blue (B) are alternately arranged in order from the left in pixels in even-numbered rows.

Figure 2B:
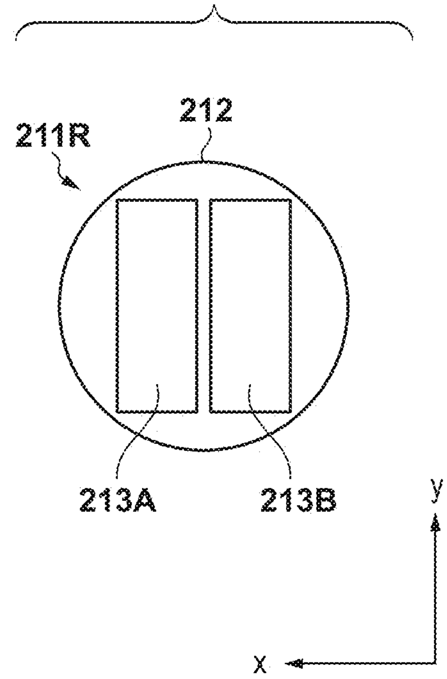

FIG. 2B illustrates a pixel 211R in which a color filter of red (R) is arranged. 212 denotes an on-chip microlens. A pair of photoelectric conversion sections (first pair of photoelectric conversion sections) 213A and 213B divided in the x direction are arranged inside the on-chip microlens 212. A pixel 211Gr in which a color filter of green (G) is arranged and a pixel 211B in which a color filter of blue (B) is arranged are similarly configured.

Figure 2C:
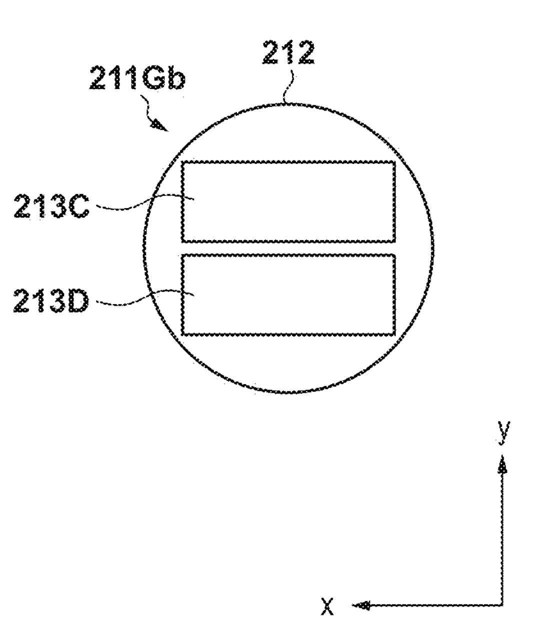

FIG. 2C illustrates a pixel 211Gb in which a color filter of green (G) is arranged. A pair of photoelectric conversion sections (second pair of photoelectric conversion sections) 213C and 213D divided in the y direction are arranged inside the on-chip microlens 212.

As described above, the image capturing element 121 in the present embodiment includes the pixels 211R, 211Gr, and 211B in which the photoelectric conversion section is divided into two in the x direction, and the pixel 211Gb in which the photoelectric conversion section is divided into two in the y direction. Here, the horizontal direction and the vertical direction are illustrated as the directions of pupil division, but the pupil division may be performed in an oblique direction.

A pair of image signals (focus detection signals) and parallax image data as display/recording image data for 3D image observation are generated using photoelectric conversion signals output from each of the pair of photoelectric conversion sections in a plurality of pixels. Luminance determination image data and normal display/recording image data are generated using an image capturing signal in which a pair of photoelectric conversion signals are added from each of the plurality of pixels and output.

Returning to FIG. 1, a CDS/AGC/AD circuit 123 performs correlated double sampling for removing reset noise, adjustment of a sensor gain, and digitization of a signal on a voltage signal (an image capturing signal and a focus detection signal) read from the image capturing element 121. Then, the CDS/AGC/AD circuit 123 outputs an image capturing signal after processing to an image capturing signal processing unit 124 and outputs a focus detection signal after processing to a focus detection signal processing unit 125.

The focus detection signal processing unit 125 performs setting and arrangement of a focus detection region for performing focus detection. Here, among focus detection signals output from the CDS/AGC/AD circuit 123, focus detection signals output from pixels included in a predetermined region are extracted.

Here, focus detection by the imaging plane phase difference detection method will be described. In the pixel 211R (211Gr and 211B) illustrated in FIG. 2B, the microlens 212 performs pupil division in the x direction by causing the photoelectric conversion section 213A and the photoelectric conversion section 213B to form an image with light fluxes from regions different from each other in the x direction in an exit pupil of the optical system. In the pixel 211Gb illustrated in FIG. 2C, the microlens 212 performs pupil division in the y direction by causing the photoelectric conversion section 213C and the photoelectric conversion section 213D to form an image with light fluxes from regions different from each other in the y direction in an exit pupil of the optical system. In other words, the phase difference in the first direction of the optical image by the light having passed through the pupil regions different from each other in the optical system and the phase difference in the second direction different from the first direction are detected.

The focus detection signal processing unit 125 generates an A image signal by synthesizing photoelectric conversion signals obtained from one of the pair of photoelectric conversion sections 213A and 213B in each of the plurality of pixels 211R in a predetermined range (focus detection area). A B image signal is generated by synthesizing photoelectric conversion signals obtained from the other.

Similarly, the focus detection signal processing unit 125 generates a C image signal by synthesizing photoelectric conversion signals obtained from one of the pair of photoelectric conversion sections 213C and 213D in each of the plurality of pixels 211Gb in the focus detection area. A D image signal is generated by synthesizing photoelectric conversion signals obtained from the other.

Correlation calculation is performed on these pairs of image signals (A image signal and B image signal, and C image signal and D image signal) to obtain a defocus amount and reliability information (two-image matching level and two-image steepness).

In the present embodiment, in the AF control before photographing a still image, reading in the non-thinning reading mode is executed, and a correlation calculation (horizontal direction focus detection) result between the A image signal and the B image signal and a correlation calculation (vertical direction focus detection) result between the C image signal and the D image signal are used in combination. In the standby AF control, reading in the vertical thinning reading mode is executed, and only a correlation calculation (horizontal direction focus detection) result between the A image signal and the B image signal is used.

The image capturing signal processing unit 124 performs predetermined image processing such as γ conversion processing, white balance processing, and various correction processing on an image capturing signal output from the CDS/AGC/AD circuit 123, and stores the image data after processing in an SDRAM 136 via a bus 131.

The display image data stored in the SDRAM 136 is read by a display control unit 132 via the bus 131 and displayed on a display unit 133. The recording image data is recorded on a recording medium 135 by a recording medium control unit 134 in an operation mode for performing recording.

The luminance determination image data is used for measurement (photometry) of the subject luminance in a photometry unit 142, and a photometry result is output to the camera control unit 141.

Exposure setting (AE) is determined based on the photometry result and the camera control values such as charge accumulation time, photographing sensitivity, and a diaphragm value.

A vibration detection unit 143 detects and outputs, to the camera control unit 141, an angular velocity around a predetermined axis with a shake sensor such as a gyro sensor. Based on these detection signals, the camera control unit 141 drives a correction optical system for camera shake correction and detects the orientation of the camera body.

A ROM 137 stores a control program executed by the camera control unit 141, various types of data necessary for control, and the like, and a flash ROM 138 stores various types of setting information regarding the operation of the camera body 102 such as user setting information.

A photographing preparation switch (SW1) 139 is turned on by, for example, half-pressing of a shutter release button not illustrated or the like, and instructs start of photographing preparation operation such as AF or AE (hereinafter, called "SW1"). After SW1 is turned on, a photographing switch (SW2) 140 is turned on by, for example, full pressing of a shutter release button not illustrated or the like, and instructs photographing (hereinafter, called "SW2").

The camera control unit 141 determines the lens driving amount based on the defocus amount and the reliability information output from the focus detection signal processing unit 125. The lens driving amount is transmitted to the focus control unit 116 via the lens control unit 117, and the focus control unit 116 achieves AF by driving the focus lens 114.

Figure 3:
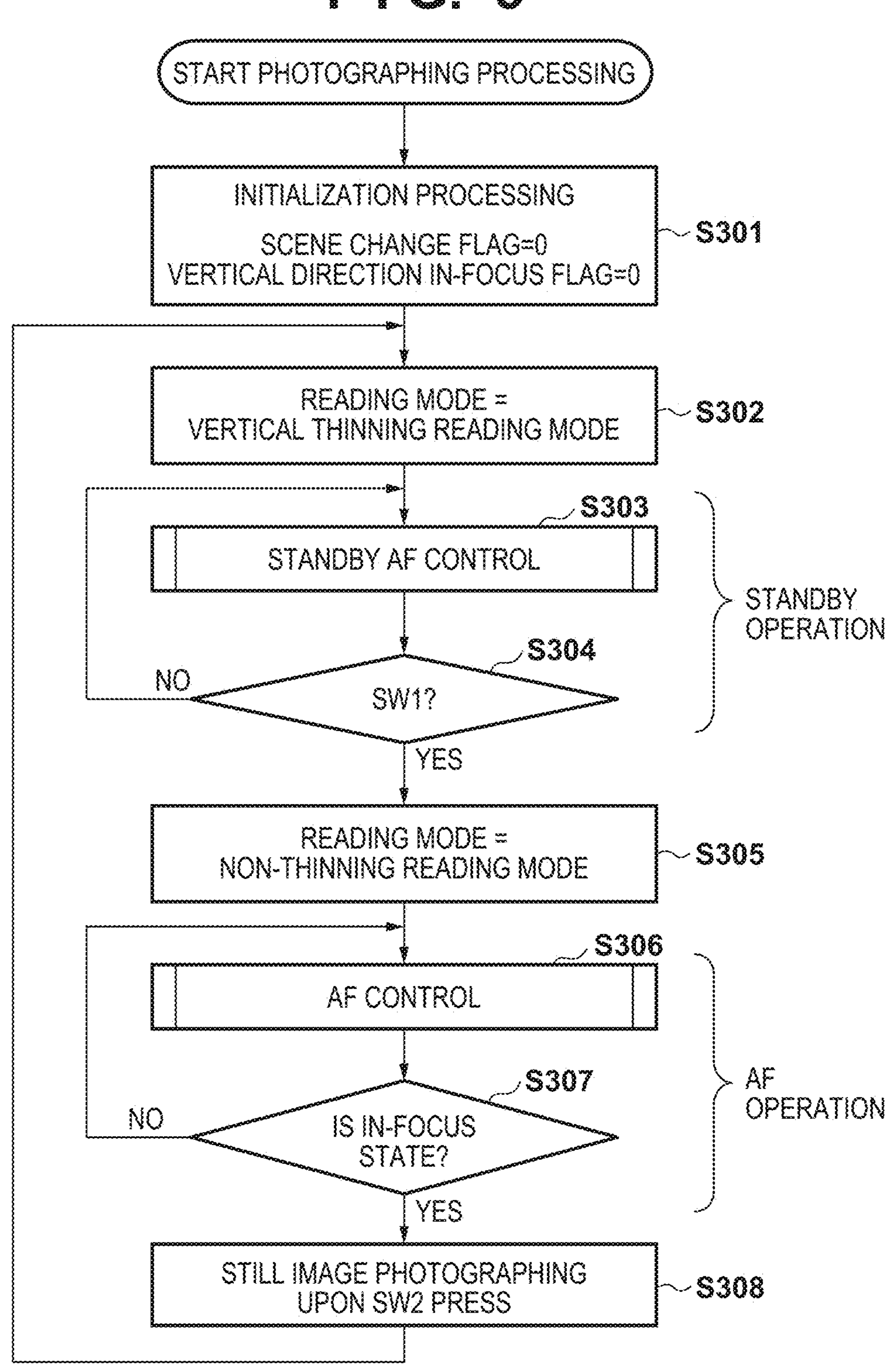
FIG. 3 is a flowchart showing photographing processing in the first embodiment.

Next, photographing processing performed by the camera body 102 will be described with reference to FIG. 3. This processing is achieved by the camera control unit 141 executing a control program stored in the ROM 137. The same applies to operations of other flowcharts described below.

First, in step S301, the camera control unit 141 performs initialization processing such as camera setting, and proceeds with the process to step S302. In the present embodiment, initialization of a scene change flag and a vertical direction in-focus flag is also performed here. The scene change flag is a flag set by determining whether the user has changed the photographing scene in step S401 described later, and is set to zero as an initial state. The vertical direction in-focus flag is a flag for setting whether to be in a state of being in-focus by using vertical direction focus detection in step S306 described later, and the initial state is set to zero.

In step S302, the camera control unit 141 sets the reading mode to the vertical thinning reading mode, and proceeds with the process to step S303.

In step S303, standby AF control processing is executed, and the process proceeds to step S304. In the standby AF control processing in step S303, since the reading mode is set to the vertical thinning reading mode, AF control is performed using a horizontal direction focus detection result. Details will be described later with reference to FIG. 4.

In step S304, the camera control unit 141 determines whether or not SW1 has been pressed. If not pressed, the process returns to step S303, and the standby operation (step S303 and step S304) is repeated, and if pressed, the process proceeds to step S305.

In step S305, the camera control unit 141 sets the reading mode to the non-thinning reading mode, and proceeds with the process to step S306.

In step S306, the camera control unit 141 executes the AF control processing, and proceeds with the process to step S307. In the AF control processing of step S306, since the reading mode is set to the non-thinning reading mode, AF control is performed using both the horizontal direction focus detection result and a vertical direction focus detection result. Details will be described later with reference to FIG. 7.

In step S307, the camera control unit 141 determines whether or not to be in an in-focus state. If not in the in-focus state, the process returns to step S306, and the AF operation (step S306 and step S307) is repeated. If in the in-focus state, SW2 can be pressed in step S308, and photographing of a still image is executed by pressing SW2.

After photographing of the still image, the process returns to step S302, the reading mode is switched to the vertical thinning reading mode, and the process transitions to the standby operation (step S303 and step S304).

Also if SW2 is not pressed and pressing of SW1 is released in step S308 (not illustrated), the process returns to step S302, the reading mode is switched to the vertical thinning reading mode, and the process transitions to the standby operation (step S303 and step S304).

This process is repeated until the photographing processing is stopped. The time when the photographing processing is stopped is the time when the camera body 102 is powered off, or the time when interruption processing of operation other than photographing, such as user setting processing of the camera and reproduction processing for checking a photographed image or moving image, is performed.

Next, the standby AF control processing performed in step S303 in FIG. 3 will be described with reference to the flowchart in FIG. 4.

In step S401, the camera control unit 141 performs scene change determination processing of determining whether or not the photographing scene has changed.

Figure 5:
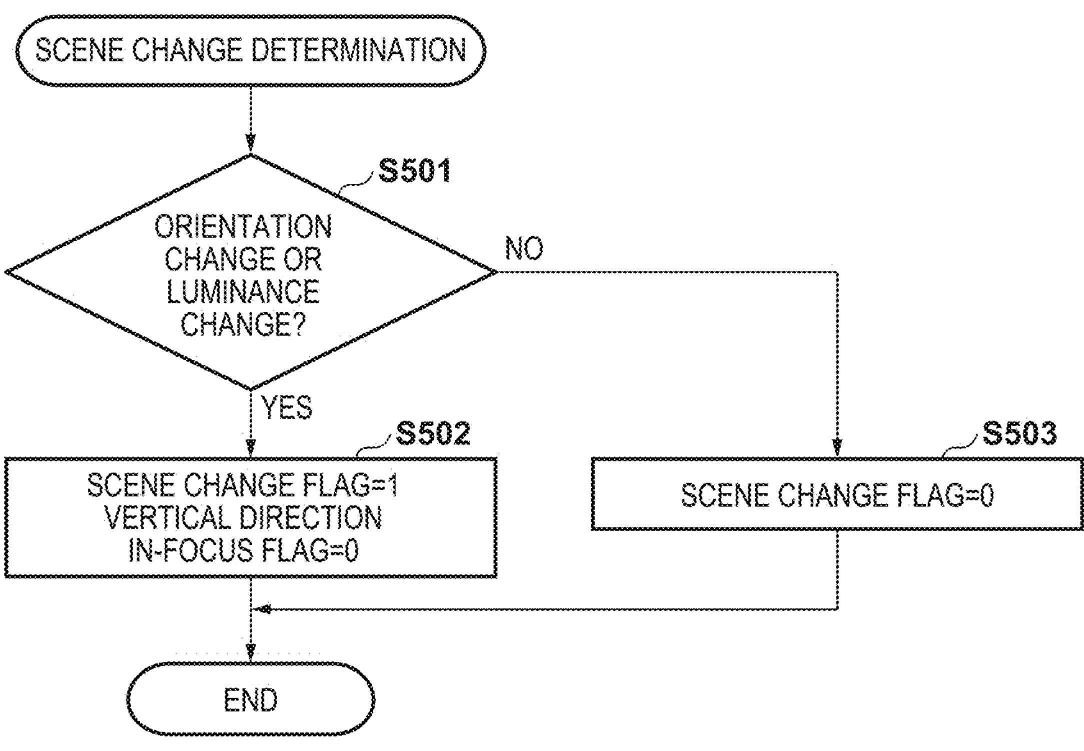
FIG. 5 is a flowchart showing scene change determination processing in the first and second embodiments.

Here, processing in the scene change determination in step S401 will be described with reference to FIG. 5.

In step S501, the camera control unit 141 compares the detection results of the photometry unit 142 and the vibration detection unit 143 with the detection result at the time of the previous determination, and determines presence of a change. If it is determined in step S501 that there is an orientation change or a luminance change of the camera, it is the time when the user changes the photographing scene and the subject also changes, and therefore it is necessary to newly perform focus detection again. Therefore, in step S502, the camera control unit 141 sets the scene change flag to 1, resets a vertical direction in-focus state flag at the same time (sets the vertical direction in-focus state flag to zero), and ends the process.

If it is determined in step S501 that there is no orientation change nor luminance change of the camera, the camera control unit 141 sets in step S503 the scene change flag to zero and ends the process. In this case, since the vertical direction in-focus state needs to be maintained, the flag is not set.

Regarding the orientation change and the luminance change, it is preferable to determine the threshold and continuity in consideration of camera shake and the like. For example, the detection results of the photometry unit 142 and the vibration detection unit 143 are saved in a dedicated memory, and when a plurality of saved results exceed a predetermined threshold a predetermined number of times, it is determined that there is a change.

Note that, in the present embodiment, the case where a change in the photographing scene is determined based on the orientation change or the luminance change has been described as an example, but it can also be determined by a change in a subject detection state. When there is a detection subject, it is useful because it is easy to reflect a user's intention. A change in the subject detection state indicates a case where the subject cannot be detected, another subject is selected when there are a plurality of subjects, or the subject moves. Movement of the subject can be determined based on a criterion as to whether or not a size change and a position change of the subject with respect to the angle of view have exceeded a certain amount.

When step S401, which is the scene change determination processing, ends, the camera control unit 141 proceeds with the process to focus detection processing of step S402.

The focus detection processing in step S402 will be described with reference to the flowchart in FIG. 6.

First, in step S601, the camera control unit 141 sets zero to a vertical direction calculation flag i and sets an initial value to a calculation result, and proceeds with the process to step S602. The vertical direction calculation flag i is a flag for determining whether or not it is a focus detection calculation in the vertical direction (a focus detection calculation in the horizontal direction).

In step S602, the camera control unit 141 extracts a focus detection signal in the focus detection region from among the focus detection signals output from the image capturing element 121. A pair of image signals (image A and image B when the vertical direction calculation flag i=0, and image C and image D when the vertical direction calculation flag i=1) are generated from the extracted focus detection signal. Then, the process proceeds to step S603.

In step S603, the camera control unit 141 performs an averaging process on each of the pair of image signals generated in step S602 in a direction orthogonal to the pupil division direction (the y direction when the vertical direction calculation flag i=0, and the x direction when the vertical direction calculation flag i=1). Thereafter, the process proceeds to step S604. The averaging process in step S603 can reduce an influence of noise of the image signal.

In step S604, the camera control unit 141 performs filter processing of extracting a signal component in a predetermined frequency band from the pair of image signals obtained by the averaging process in step S603, and proceeds with the process to step S605. Here, a low-pass filter that extracts a low frequency component of a signal and a high-pass filter that extracts a high frequency component may be used, a middle-pass filter that can extract an intermediate frequency component between the low-pass filter and the high-pass filter may be used, or three or more types of filters may be used.

In step S605, the camera control unit 141 calculates a correlation amount using the pair of image signals subjected to filter processing in step S604.

In step S606, the camera control unit 141 calculates a correlation change amount from the correlation amount calculated in step S605.

In step S607, the camera control unit 141 calculates an image shift amount from the correlation change amount calculated in step S606.

In step S608, the camera control unit 141 acquires Defocus_0 (horizontal direction calculation result) or Defocus_1 (vertical direction calculation result) converted into a defocus amount by multiplying the image shift amount by a conversion coefficient. This conversion coefficient is a value corresponding to a zoom lens position, a diaphragm value, and an image height of the imaging plane, and is held by the camera.

In step S609, the camera control unit 141 acquires Reliability_0 (evaluation result of the horizontal direction calculation result) or Reliability_1 (evaluation result of the vertical direction calculation result), which is an evaluation result of reliability indicating how reliable the defocus amount calculated in step S608 is, and proceeds with the process to step S610.

The reliability is determined by estimating a standard deviation of the defocus amount based on the values calculated in the processes in step S605 and step S606 and setting a stepwise threshold to the standard deviation. However, the method of reliability determination is not limited to this method, and other known methods may be used.

In the present embodiment, as an evaluation results of reliability, a case where there is reliability (reliability is a predetermined value or more: the defocus amount can be used for the focus operation) is expressed as high, and a case where there is no reliability (reliability is less than the predetermined value: the defocus amount cannot be used for the focus operation) is expressed as low. Here, the reliability is divided into two levels for easy understanding of the description, but reliability in a middle between high and low or the like may be used, or the reliability may be divided into three or more levels.

In step S610, the camera control unit 141 determines whether the focus detection calculation in the vertical direction is necessary (the reading mode is the non-thinning reading mode).

Figure 4:
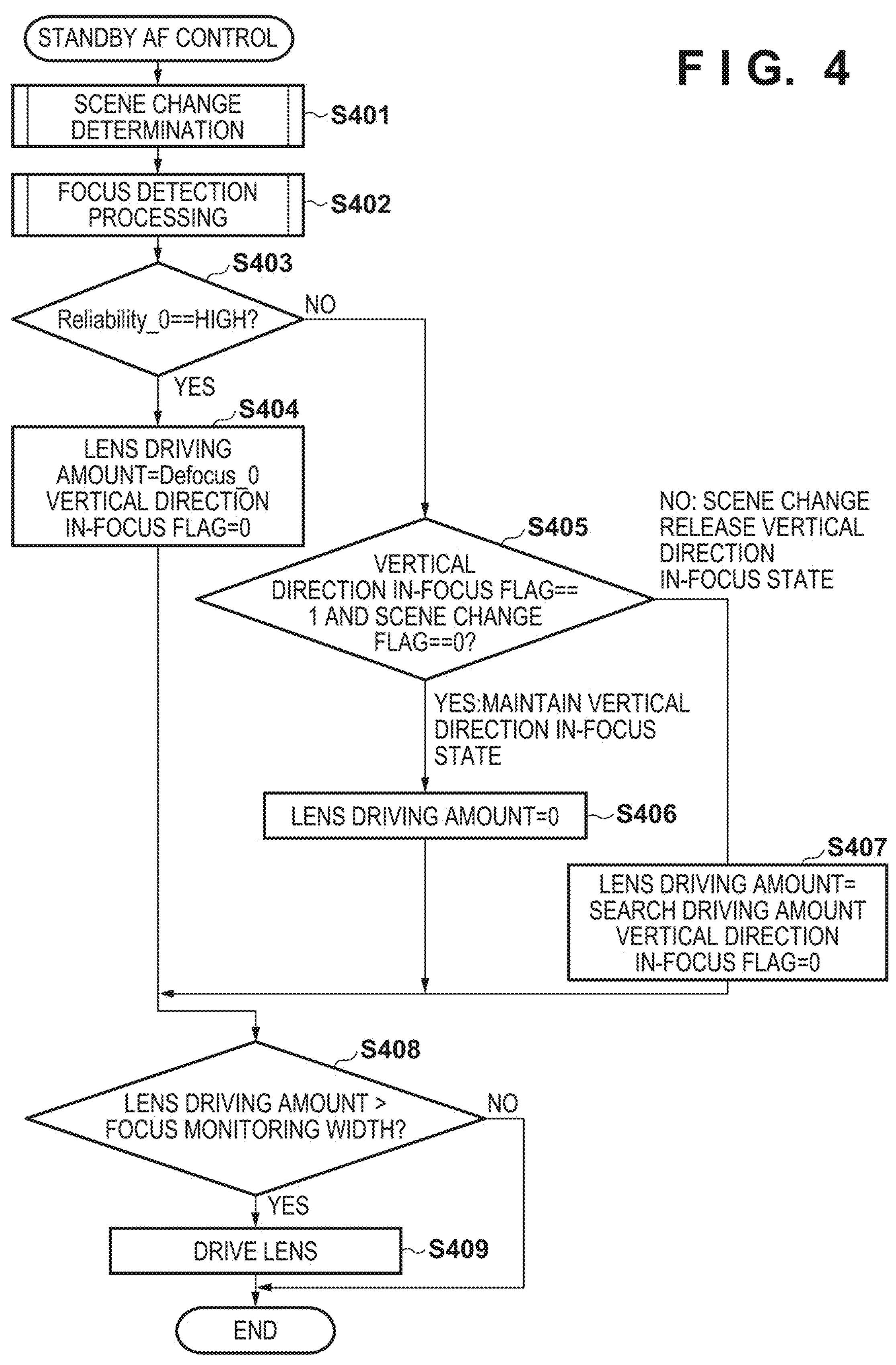
FIG. 4 is a flowchart showing a standby AF process in the first embodiment.

In step S401 of FIG. 4, the focus detection calculation in the vertical direction is unnecessary in the standby AF (the reading mode is the vertical thinning reading mode). Therefore, if the process proceeds from step S401 to the flow of FIG. 6, the camera control unit 141 ends the process of this flow from the determination that the focus detection calculation in the vertical direction in step S610 is unnecessary, and returns to step S403 of FIG. 4. Note that a case where the focus detection calculation in the vertical direction is necessary (the reading mode is the non-thinning reading mode) will be described in the focus detection processing in step S701 in FIG. 7 including steps S611 and S612.

In step S403 of FIG. 4, the camera control unit 141 determines the reliability acquired in step S609, and proceeds with the process to step S404 when the reliability of the focus detection calculation in the horizontal direction is high. In this case, the reliability of the result of the focus detection calculation in the horizontal direction is high, and there is a high possibility that the subject can be focused. Therefore, in step S404, the camera control unit 141 sets, as a lens driving amount, the defocus amount by the focus detection calculation in the horizontal direction acquired in step S608. Then, since the focus detection calculation result is switched to a focus detection calculation result in the horizontal direction, the vertical direction in-focus state flag is set to zero, and the process proceeds to step S408.

On the other hand, if it is determined in step S403 that the reliability acquired in step S609 is low, the camera control unit 141 proceeds with the process to step S405, and determines whether or not to be in the vertical direction in-focus state and presence of a scene change. If in the vertical direction in-focus state and there is no scene change, the camera control unit 141 proceeds with the process to step S406.

In this case, since the defocus amount of the focus detection calculation in the horizontal direction acquired in step S608 is not reliable and the scene has not changed, the vertical direction in-focus state is maintained. Therefore, in step S406, the camera control unit 141 sets the lens driving amount to zero, and proceeds with the process to step S408.

If not in the vertical direction in-focus state or there is a scene change in step S405, the process proceeds to step S407. In this case, since the defocus amount of the focus detection calculation in the horizontal direction acquired in step S608 is also not reliable, a search driving amount is set as the lens driving amount, and the process transitions to search operation of searching for the subject (focal position). The camera control unit 141 sets the vertical direction in-focus flag to zero, releases the vertical direction in-focus state, and proceeds with the process to step S408.

In step S408, the camera control unit 141 determines whether the lens driving amount set in the previous step is larger than a focus monitoring width. The focus monitoring width is a threshold for preventing unnecessary movement of the lens when the focus is already in focus and is desirably set to about 1 Fδ. If the lens driving amount is larger than the focus monitoring width, the camera control unit 141 proceeds with the process to step S409, drives the lens by the set lens driving amount, and ends the process. If the lens driving amount is equal to or smaller than the focus monitoring width, the camera control unit 141 does not drive the lens, and ends the process.

Next, the AF control in step S306 in FIG. 3 will be described with reference to the flowchart in FIG. 7.

First, the focus detection processing in step S701 will be described with reference to the flowchart in FIG. 6. Since steps S601 to S609 are the same processes as the focus detection processing in step S402 in FIG. 4 described above, the description thereof is omitted.

In step S701 of the focus detection processing in FIG. 7, since the reading mode is the non-thinning reading mode, it is determined in step S610 that the focus detection calculation in the vertical direction is necessary, and the camera control unit 141 proceeds with the process to step S611.

In step S611, the camera control unit 141 determines whether the focus detection calculation in the vertical direction has ended. When the vertical direction calculation flag i is zero, since the focus detection calculation in the vertical direction has not ended, the process proceeds to step S612.

In step S612, the camera control unit 141 sets 1 to the vertical direction calculation flag i, and returns to step S602 to execute the focus detection calculation in the vertical direction. When the process proceeds to step S611 again, since the vertical direction calculation flag is 1, the processing is ended, and the process returns to step S702 in FIG. 7.

In this case, in steps S608 and S609, the horizontal direction calculation result (Defocus_0 and Reliability_0) and the vertical direction calculation result (Defocus_1 and Reliability_1) are acquired.

Next, in step S702, the camera control unit 141 determines reliability of the focus detection calculation result in the vertical direction and the focus detection calculation result in the horizontal direction. When the reliability is low in both, the camera control unit 141 proceeds with the process to step S706.

In this case, since the defocus amount acquired in step S608 is not reliable, the camera control unit 141 sets in step S706 the search driving amount as the lens driving amount and transitions to the search operation of searching for the subject. The vertical direction in-focus flag is set to zero, the vertical direction in-focus state is released, and the process proceeds to step S707.

On the other hand, if the reliability of the vertical direction calculation result or the horizontal direction calculation result is better than low in step S702, the camera control unit 141 proceeds with the process to step S703 and compares the reliability to determine which calculation result to use. If the reliability of the focus detection calculation in the vertical direction is higher, the camera control unit 141 sets in step S704 the focus detection calculation result in the vertical direction to the lens driving amount, sets 1 to the vertical direction in-focus flag, and proceeds with the process to step S707.

If the reliability of the focus detection calculation result in the horizontal direction is higher, the camera control unit 141 sets in step S705 the focus detection calculation result in the horizontal direction to the lens driving amount (permits transition to the horizontal direction calculation result), sets zero to the vertical direction in-focus flag, and proceeds with the process to step S707.

In step S707, the camera control unit 141 determines whether or not the lens driving amount set in the previous step is larger than a focus management width. The focus management width is a threshold for determining whether or not to be in an in-focus state, and is desirably set to about 0.25 to 0.5 Fδ smaller than the focus monitoring width (about 1 Fδ) in step S408.

If the lens driving amount is larger than the focus management width, the camera control unit 141 proceeds with the process to step S708, drives the lens by the set lens driving amount, and ends the process.

If the lens driving amount is equal to or less than the focus management width, the camera control unit 141 proceeds with the process to step S709, determines to be in the in-focus state, and ends the process.

Here, the effects of the present embodiment will be described with reference to FIG. 3 with an example of a case where focus detection is performed on a subject with horizontal stripes.

In a case of a subject with horizontal stripes, since the vertical thinning mode is set in step S302, focus detection cannot be performed, and in the standby operation (step S303 and step S304) immediately after the camera is started, a blurred state is established during the standby.

When SW1 is pressed in step S304 and the reading mode is switched to the non-thinning reading mode in step S305, focus detection can be performed by focus detection calculation in the vertical direction. Therefore, in the in-AF operation (step S306 and step S307), the state becomes the vertical direction in-focus state (setting of the vertical direction in-focus flag=1 in step S704 in FIG. 7), the process proceeds to step S308, and photographing of a still image becomes possible.

After photographing of a still image in step S308, the process returns to step S302, and when the mode is switched to the vertical thinning mode, focus detection cannot be performed again, and therefore, in a known art, a problem such as sudden blurring occurs due to transition to the search operation for searching for the subject although the subject has not changed.

In the present embodiment, when the vertical direction in-focus flag=1, it is determined in step S405 of FIG. 4 that the vertical-direction in-focus state is maintained, and the lens is not moved, and therefore the state where the subject with horizontal stripes is in focus is maintained. This state is maintained until it is determined in the scene change determination in step S401 in FIG. 4 that the photographing scene has changed (the user has switched the subject) or it is determined in step S403 in FIG. 4 that the reliability (Reliability_0) of the focus detection calculation result in the horizontal direction during standby is high. Therefore, it is possible to stabilize a state where the subject with horizontal stripes is in focus while the subject does not change from the subject with horizontal stripes.

As described above, according to the present embodiment, the AF control can be stably performed even when the phase difference detection direction is switched.

Second Embodiment

Next, photographing processing performed by the camera body 102 in the second embodiment will be described with reference to FIGS. 8 to 10. In the first embodiment, when the phase difference detection direction is switched, the focus adjustment is stabilized by not moving the lens until there is a scene change or until the reliability of the focus detection in the detection direction after the switching becomes high.

In the second embodiment, focus adjustment is stabilized by maintaining a focus detectable state without changing the reading mode. Note that the same steps as those in the flowchart of the first embodiment described in FIGS. 3 to 7 are denoted by the identical reference numerals, and description thereof is omitted.

Figure 8:
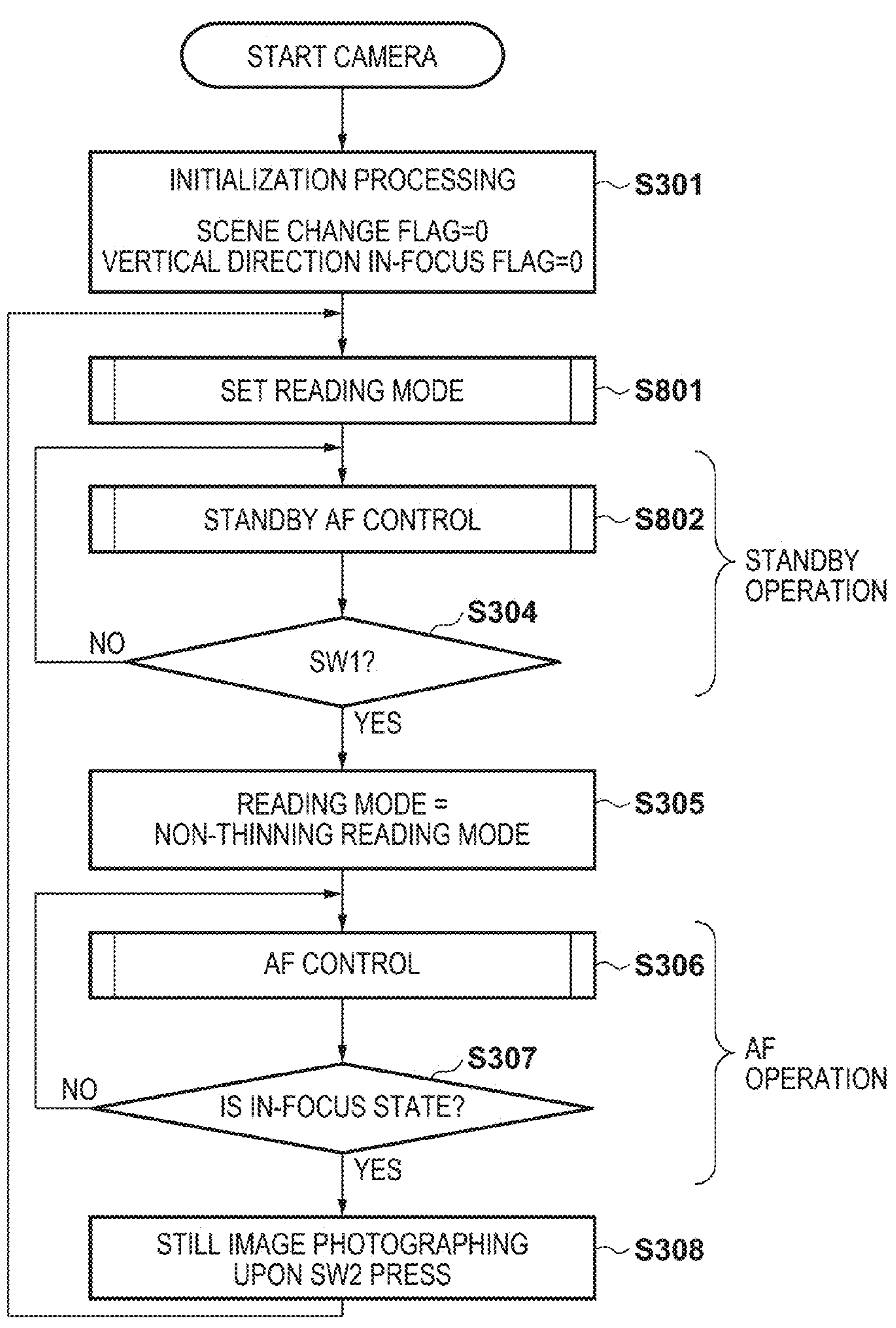
FIG. 8 is a flowchart showing photographing processing in the second embodiment.

In FIG. 8, in step S301, the camera control unit 141 performs initialization processing and proceeds with the process to step S801.

In step S801, the camera control unit 141 sets the reading mode and proceeds with the process to step S802.

In step S802, the camera control unit 141 executes the standby AF control and proceeds with the process to step S304. Step S304 and subsequent steps are the same as those in FIG. 3.

Here, the reading mode setting in step S801 will be described with reference to the flowchart in FIG. 9.

In step S401, the camera control unit 141 executes processing of scene change determination (FIG. 5), and proceeds with the process to step S901.

In step S901, the camera control unit 141 determines whether or not to be in the vertical direction in-focus state and presence of a scene change. If the vertical direction is in the in-focus state and there is no scene change, the camera control unit 141 proceeds with the process to step S902. In this case, since it is desired to continue the focus detection calculation in the vertical direction, the non-thinning reading mode is set as the reading mode, the process is ended, and the process proceeds to step S802 in FIG. 8.

If it is determined in step S901 to be not in the vertical direction in-focus state or there is a scene change, the camera control unit 141 does not need to perform the vertical direction calculation, and thus, sets the vertical thinning reading mode as the reading mode, ends the process, and proceeds with the process to step S802.

Next, the standby AF control processing in the second embodiment of step S802 will be described with reference to the flowchart of FIG. 10.

In step S701, the camera control unit 141 performs focus detection processing (FIG. 6). In step S701, if the non-thinning reading mode is set as the reading mode in step S801, the horizontal direction calculation result (Defocus_0 and Reliability_0) and the vertical direction calculation result (Defocus_1 and Reliability_1) are acquired in steps S608 and S609 of FIG. 6.

On the other hand, if the vertical thinning reading mode is set as the reading mode in step S801, only the horizontal direction calculation result (Defocus_0 and Reliability_0) is acquired in steps S608 and S609, and the initial value is substituted into the vertical direction calculation result (Defocus_1 and Reliability_1).

In step S1001, the camera control unit 141 determines whether or not the defocus amount (Defocus_1) of the focus detection calculation result in the vertical direction is an initial value. If the vertical thinning reading mode is set as the reading mode in step S801, the initial value is set in Defocus_1, and thus the process proceeds to step S1002.

In step S1002, the camera control unit 141 determines the reliability of the horizontal direction calculation result acquired in step S609, and proceeds with the process to step S1003 if the reliability is high.

In step S1003, the camera control unit 141 sets the defocus amount (Defocus_0) acquired in step S608 to the lens driving amount, and proceeds with the process to step S408.

If it is determined in step S1002 that the reliability of the horizontal direction calculation result acquired in step S609 is low, the camera control unit 141 proceeds with the process to step S1004.

In step S1004, since the defocus amount (Defocus_0) acquired in step S608 is not reliable, the camera control unit 141 sets the search driving amount as the lens driving amount and proceeds with the process to step S408.

On the other hand, if the non-thinning reading mode is set as the reading mode in step S801, the defocus amount (Defocus_1) of the focus detection calculation result in the vertical direction in step S1001 is not an initial value, and thus the camera control unit 141 proceeds with the process to step S1005.

In step S1005, the camera control unit 141 determines the reliability of the focus detection calculation result in the vertical direction acquired in step S609. If the reliability is low, in order to release the vertical direction in-focus state, the process proceeds to step S1006, the vertical direction in-focus flag is set to zero, and the process proceeds to step S1002.

In step S1002, similarly to the above, the camera control unit 141 determines the reliability of the horizontal direction calculation result, sets the lens driving amount, and proceeds with the process to step S408.

If it is determined in step S1005 that the reliability of the focus detection calculation result in the vertical direction acquired in step S609 is high, the camera control unit 141 proceeds with the process to step S1007.

In step S1007, the camera control unit 141 determines the reliability of the focus detection calculation result in the horizontal direction acquired in step S609. If the reliability is low, since the vertical direction in-focus state continues, the process proceeds to step S1008, the defocus amount (Defocus_1) of the vertical direction calculation result acquired in step S608 is set to the lens driving amount, and the process proceeds to step S408.

If it is determined in step S1007 that the reliability of the horizontal direction calculation result acquired in step S609 is high, the process proceeds to step S1009, and the camera control unit 141 determines whether the phase difference detection direction can be switched.

In step S1009, it is determined whether or not an absolute value (|Defocus_0−Defocus_1|) of the difference between the defocus amounts of the focus detection calculation result in the horizontal direction and the focus detection calculation result in the vertical direction acquired in step S608 is larger than a threshold Th. The threshold Th for switching of the phase difference detection direction is a threshold for determining that there is no discomfort even if switching is performed from the focus detection calculation in the vertical direction to the focus detection calculation result in the horizontal direction, and therefore it is preferable to set the threshold Th to about 1 Fδ.

If it is determined in step S1009 that the absolute value of the difference between the defocus amounts is larger than the threshold Th, the camera control unit 141 proceeds with the process to step S1008 in order to maintain the vertical direction in-focus state. Then, the defocus amount (Defocus_1) of the focus detection calculation result in the vertical direction acquired in step S608 is set as the lens driving amount, and the process proceeds to step S408.

If it is determined in step S1009 that the absolute value of the difference between the defocus amounts is equal to or less than the threshold Th, the camera control unit 141 proceeds with the process to step S1010. Then, in order to switch to the focus detection calculation result in the horizontal direction, the vertical direction in-focus flag is set to zero, the vertical direction in-focus state is released, and the process proceeds to step S1003.

In step S1003, the camera control unit 141 sets the defocus amount (Defocus_0) of the focus detection calculation result in the horizontal direction acquired in step S608 as the lens driving amount, and proceeds with the process to step S408.

Since steps S408 and S409 are identical to the steps in FIG. 4, the description thereof will be omitted.

Here, the effects of the present embodiment will be described with reference to FIG. 8 with an example of a case where focus detection is performed on a subject with horizontal stripes.

In a case of a subject with horizontal stripes, since the vertical thinning mode is set in step S801 immediately after the camera is started, in the standby operation (step S303 and step S304) immediately after the camera is started, focus detection cannot be performed, and a blurred state is established during the standby. When SW1 is pressed in step S304 and the reading mode is switched to the non-thinning reading mode in step S305, focus detection can be performed by the vertical direction calculation. Therefore, in the in-AF operation (step S306 and step S307), the state becomes the vertical direction in-focus state (setting of the vertical direction in-focus flag=1 in step S704 in FIG. 7), the process proceeds to step S308, and photographing of a still image becomes possible.

After photographing of a still image in step S308, the process returns to step S801, and if in the vertical direction in-focus state (vertical direction in-focus flag=1), it is determined that the vertical direction calculation is necessary in step S901 of FIG. 9. Then, in step S902, the non-thinning reading mode is set, and the vertical direction calculation is continued, and therefore the subject with horizontal stripes can be kept in focus. Similarly to the first embodiment, this state is maintained until it is determined in the scene change determination in step S401 in FIG. 9 that the photographing scene has changed (the user has switched the subject) or the reliability (Reliability_1) of the vertical direction calculation result during standby becomes low in step S1005 of FIG. 10. Therefore, it is possible to stably focus on the subject with horizontal stripes while the subject does not change from the subject with horizontal stripes.

Alternatively, in step S1009 of FIG. 10, it is maintained until it is determined that the defocus result (Defocus_0) of the horizontal direction calculation during standby and the defocus result (Defocus_1) of the vertical direction calculation are almost the same level, that is, they can be taken over to the horizontal direction calculation result. If it is determined that they can be taken over to the horizontal direction calculation result, focus driving is performed with the defocus result (Defocus_0) of the horizontal direction calculation in step S1003 of FIG. 10, and even if the reading mode is also switched to the vertical thinning reading mode in step S903 of FIG. 9, stable focus control can be performed.

As described above, according to the present embodiment, the AF control can be stably performed even when the phase difference detection direction is switched.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-204911, filed Dec. 4, 2023, which is hereby incorporated by reference herein in its entirety.

What is claimed is:

1. An image capturing apparatus, comprising:

at least one processor or circuit configured to function as:

a phase difference detection unit configured to detect a phase difference in a first direction of an optical image by light having passed through different pupil regions of an optical system and a phase difference in a second direction different from the first direction;

a focus detection unit configured to detect a focusing state based on at least one of the phase difference in the first direction and the phase difference in the second direction and acquire reliability of the focusing state;

an adjustment unit configured to perform focus adjustment by driving the optical system based on the focusing state detected by the focus detection unit; and a control unit configured to control the adjustment unit not to perform the focus adjustment based on the phase difference in the second direction until the reliability of the focusing state detected based on the phase difference in the second direction becomes higher than a predetermined value in a case of transitioning from a first state in which focus adjustment is performed based on the phase difference in the first direction to a second state in which focus adjustment is performed based on the phase difference in the second direction.

2. The image capturing apparatus according to claim 1, wherein in a case of transitioning from the first state to the second state, the control unit permits the focus adjustment based on the phase difference in the second direction after the reliability of the focusing state detected based on the phase difference in the second direction becomes higher than the predetermined value.

3. The image capturing apparatus according to claim 1, wherein in a case of transitioning from the first state to the second state, the control unit stops driving of the optical system until the reliability of the focusing state detected based on the phase difference in the second direction becomes higher than the predetermined value after shifting to the second state.

4. The image capturing apparatus according to claim 1, wherein in a case of transitioning from the first state to the second state, the control unit performs control not to shift to the second state until the reliability of the focusing state detected based on the phase difference in the second direction becomes higher than the predetermined value.

5. The image capturing apparatus according to claim 4, wherein in a case of transitioning from the first state to the second state, the control unit permits transition to the second state in a case where a difference between a focusing state detected based on a phase difference in the first direction and the focusing state detected based on the phase difference in the second direction is smaller than a threshold.

6. The image capturing apparatus according to claim 4, wherein the control unit permits transition to the second state in a case where there is a change in a photographing scene.

7. The image capturing apparatus according to claim 6, wherein the control unit determines the change in the photographing scene by an orientation change of the image capturing apparatus.

8. The image capturing apparatus according to claim 6, wherein the control unit determines the change in the photographing scene by a luminance change of an image.

9. The image capturing apparatus according to claim 6, wherein the control unit determines the change in the photographing scene by a change in a detected subject.

10. The image capturing apparatus according to claim 1, wherein the control unit performs control to cause the optical system to perform search driving for searching a focal position in a case where there is a change in a photographing scene.

11. The image capturing apparatus according to claim 1, wherein the focus detection unit detects, in the second state, a focusing state based on a signal in which a signal of a pixel in a direction orthogonal to the second direction is thinned out.

12. The image capturing apparatus according to claim 1, wherein the focus detection unit can detect, in the first state, a focusing state based on a phase difference in the first direction and detect a focusing state based on a phase difference in the second direction, and can detect, in the second state, a focusing state based on a phase difference in the second direction.

13. A method of controlling an image capturing apparatus, comprising:

executing phase difference detection of detecting a phase difference in a first direction of an optical image by light having passed through different pupil regions of an optical system and a phase difference in a second direction different from the first direction;

executing focus detection of detecting a focusing state based on at least one of the phase difference in the first direction and the phase difference in the second direction and acquiring reliability of the focusing state;

performing focus adjustment by driving the optical system based on the focusing state detected by the focus detection; and controlling the focus adjustment not to perform the focus adjustment based on the phase difference in the second direction until the reliability of the focusing state detected based on the phase difference in the second direction becomes higher than a predetermined value in a case of transitioning from a first state in which focus adjustment is performed based on the phase difference in the first direction to a second state in which focus adjustment is performed based on the phase difference in the second direction.

14. A non-transitory computer-readable storage medium storing a program for causing a computer to execute a method of controlling an image capturing apparatus, the method comprising:

executing phase difference detection of detecting a phase difference in a first direction of an optical image by light having passed through different pupil regions of an optical system and a phase difference in a second direction different from the first direction;

executing focus detection of detecting a focusing state based on at least one of the phase difference in the first direction and the phase difference in the second direction and acquiring reliability of the focusing state;

performing focus adjustment by driving the optical system based on the focusing state detected by the focus detection; and controlling the focus adjustment not to perform the focus adjustment based on the phase difference in the second direction until the reliability of the focusing state detected based on the phase difference in the second direction becomes higher than a predetermined value in a case of transitioning from a first state in which focus adjustment is performed based on the phase difference in the first direction to a second state in which focus adjustment is performed based on the phase difference in the second direction.

* * * * *